(12) United States Patent
Kim

(10) Patent No.: US 9,611,600 B2
(45) Date of Patent: Apr. 4, 2017

(54) CAR SHOCK ABSORBER AND CAR SHOCK ABSORBING DEVICE USING THE SAME

(71) Applicant: Dae Sung Kim, Gwacheon-si (KR)

(72) Inventor: Dae Sung Kim, Gwacheon-si (KR)

( * ) Notice: Subject to any disclaimer, the term of this patent is extended or adjusted under 35 U.S.C. 154(b) by 0 days.

(21) Appl. No.: 14/730,547

(22) Filed: Jun. 4, 2015

(65) Prior Publication Data

US 2016/0356007 A1 Dec. 8, 2016

(51) Int. Cl.
*E01F 15/08* (2006.01)
*E01F 15/14* (2006.01)
*F16F 3/12* (2006.01)

(52) U.S. Cl.
CPC .......... *E01F 15/146* (2013.01); *E01F 15/143* (2013.01); *F16F 3/12* (2013.01)

(58) Field of Classification Search
CPC .......... E01F 15/143; E01F 15/146; F16F 3/12
See application file for complete search history.

(56) References Cited

U.S. PATENT DOCUMENTS

| | | | | |
|---|---|---|---|---|
| 4,321,989 A | * | 3/1982 | Meinzer | F16F 7/12 188/377 |
| 4,407,484 A | * | 10/1983 | Meinzer | E01F 15/146 104/256 |
| 2003/0168650 A1 | * | 9/2003 | Alberson | E01F 15/146 256/13.1 |
| 2003/0210954 A1 | * | 11/2003 | Kang | E01F 15/146 404/6 |
| 2010/0080652 A1 | * | 4/2010 | Shin | E01F 15/146 404/6 |
| 2012/0121325 A1 | * | 5/2012 | Buehler | E01F 15/146 404/6 |

* cited by examiner

*Primary Examiner* — Vishal Sahni
(74) *Attorney, Agent, or Firm* — Novick, Kim & Lee, PLLC; Sang Ho Lee

(57) ABSTRACT

Provided are a car shock absorber, which is installed at a connection road exit junction of a road, such as a tunnel of the road, an underground entrance, and a freeway exit ramp, or at positions where car accidents are concerned, such as piers, abutments, and fronts of tollgates, so as to prevent damage of a car and casualties that may occur when the car collides with the car shock absorber, and a car shock absorbing device using the same. Damage of a car and casualties that may occur when the car collides with the car shock absorber and the car shock absorbing device, can be prevented, and even when the car collides with the car shock absorber and the car shock absorbing device, driving of another car is not disturbed so that the occurrence of an accident can be prevented. A car shock absorbing device according to the related art has to be reinstalled when colliding with the car once; however, the car shock absorbing device according to the present invention can be repeatedly reused without reinstallation even after colliding with the car.

9 Claims, 8 Drawing Sheets

CAR SHOCK ABSORBER AND CAR SHOCK ABSORBING DEVICE USING THE SAME

BACKGROUND OF THE INVENTION

1. Field of the Invention

The present invention relates to a car shock absorber and a car shock absorbing device using the same, and more particularly, to a car shock absorber, which is installed at a connection road exit junction of a road, such as a tunnel of the road, an underground entrance, and a freeway exit ramp, or at positions where car accidents are concerned, such as piers, abutments, and fronts of tollgates, so as to prevent damage of a car and casualties that may occur when the car collides with the car shock absorber, and a car shock absorbing device using the same.

2. Description of the Related Art

Car shock absorbing devices according to the related art are installed in the form of protective walls so as to prevent a car from colliding with facility at an entrance position of a fork in a road in which the road is divided by an entrance of the fork in the road, i.e., an underground road or a tunnel in a high-level road, and facilities installed on the road, such as piers under a bridge and tollgates in the expressway, due to driver's carelessness and to protect passengers' lives and the facilities.

Such car shock absorbing devices according to the related art may be configured of shock absorbing structures in which block-shaped concrete wall materials, sandbags and waste tires (tires) are stacked. However, in this case, these car shock absorbing devices require considerable installation lengths so as to stably and sufficiently absorb shock occurring when a car collides with the car shock absorbing device. Thus, it is difficult to install the car shock absorbing device within a limited space due to conditions of the road.

Also, when the car shock absorbing device is configured of waste tires (tires) or materials, such as urethane foam, the car shock absorbing device may be bounced off when the car collides with the car shock absorbing device, which disturbs driving of another car and causes an accident.

In particular, the car shock absorbing devices according to the related art require a long time, many efforts, and high cost for reinstallation when the car collides with the car shock absorbing device once.

SUMMARY OF THE INVENTION

The present invention provides a car shock absorber, which prevents damage of a car and casualties that may occur when the car collides with the car shock absorber, and a car shock absorbing device using the same.

According to an aspect of the present invention, there is provided a car shock absorber including: a case part having an elastic pad disposed at a side with which a car collides; a first shaft setting part configured in the case part and fixedly coupled to the side with which the car collides; a second shaft setting part fixed in the case part, disposed to face the first shaft setting part and fixedly coupled to the case part; a shaft part having one side set on and fixed to the first shaft setting part and the other side set on and fixed to the second shaft setting part; a first elastic member part inserted into the shaft part and configured at the first shaft setting part; a second elastic member part inserted into the shaft part and configured at the second shaft setting part; and a plurality of disk parts inserted into the shaft part and configured between the first elastic member part and the second elastic member part.

According to another aspect of the present invention, there is provided a car shock absorbing device including: a car shock absorber including a case part having an elastic pad disposed at a side with which a car collides, a first shaft setting part configured in the case part and fixedly coupled to the side with which the car collides, a second shaft setting part fixed in the case part, disposed to face the first shaft setting part and fixedly coupled to the case part, a shaft part having one side set on and fixed to the first shaft setting part and the other side set on and fixed to the second shaft setting part, a first elastic member part inserted into the shaft part and configured at the first shaft setting part, a second elastic member part inserted into the shaft part and configured at the second shaft setting part, and a plurality of disk parts inserted into the shaft part and configured between the first elastic member part and the second elastic member part; and a car shock guide including a rail part on which the car shock absorber is moved, and a fixture part configured at an opposite side at which the car shock absorber is disposed, to be supported by a support bracket.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a configuration and an operation of a best embodiment of the present invention will be described with reference to the attached drawings.

Figure 1:
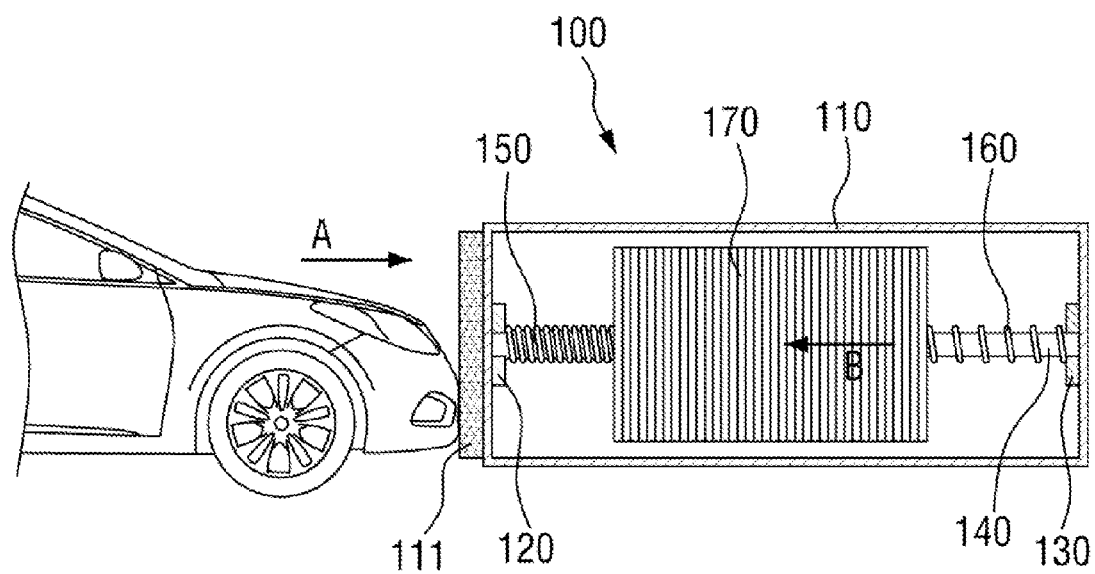
FIG. 1 is a cross-sectional view of a car shock absorber according to an embodiment of the present invention.

FIG. 1 is a cross-sectional view of a car shock absorber according to an embodiment of the present invention. A car shock absorber 100 includes a case part 110, a first shaft setting part 120, a third shaft setting part 130, a shaft part 140, a first elastic member part 150, a second elastic member part 160, and a plurality of disk parts 170.

In more detail, the case part 110 includes an elastic pad 111 disposed on a side of the case part 110 with which a car collides.

The elastic pad 111 is disposed on the side of the case part 110 with which the car collides, so as to instantaneously alleviate shock when the car collides with the car shock absorber 100.

Also, an inside of the case part 110 includes the first and second shaft setting parts 120 and 130, the shaft part 140, the first and second elastic member parts 150 and 160, and the plurality of disk parts 170. Hereinafter, a configuration and an operation of each of the above elements will be described in detail.

The first shaft setting part 120 is configured in the case part 110 and is fixedly coupled to the side with which the car collides.

The second shaft setting part 130 is fixed into the case part 110. That is, the second shaft setting part 130 is disposed to face the first shaft setting part 130 and is fixedly coupled to the case part 110.

That is, the first and second shaft setting parts 120 and 130 are disposed to face each other so that the shaft part 140 configured in the case part 110 may be set on the first and second shaft setting parts 120 and 130.

Figure 2:
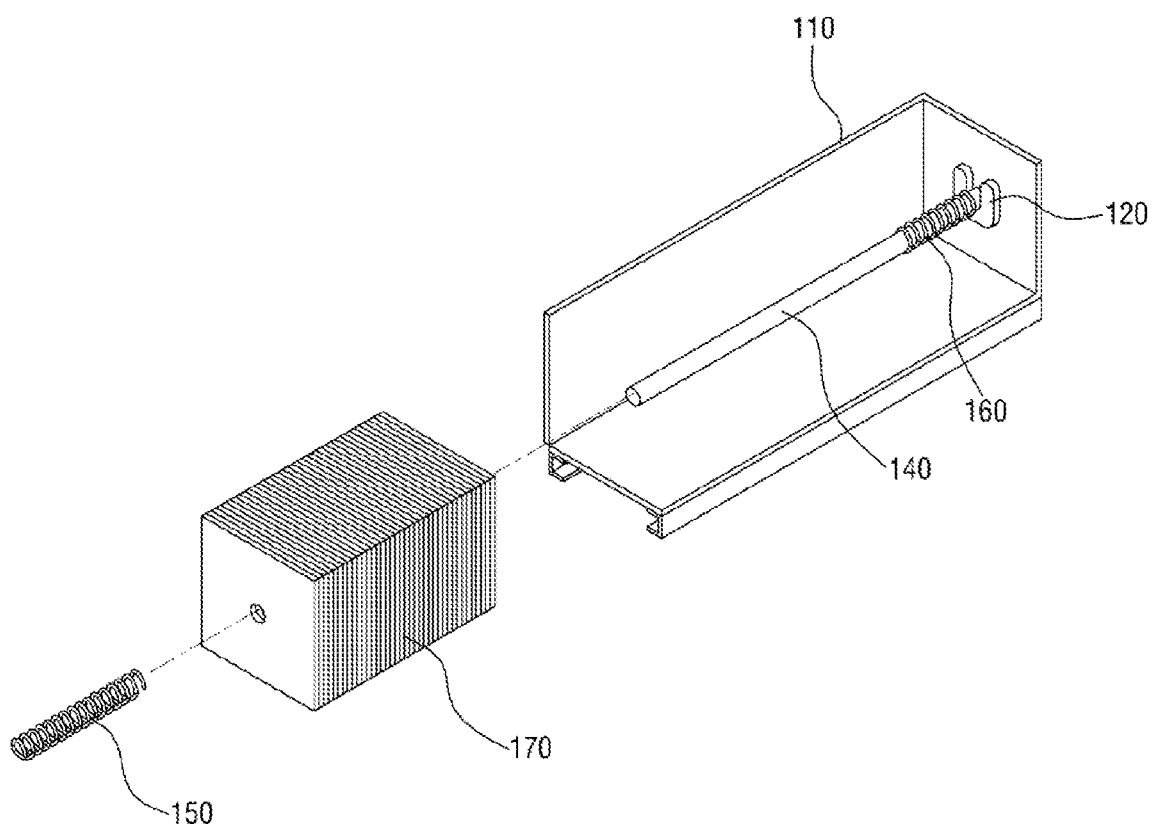
FIG. 2 is an exploded perspective view of the car shock absorber illustrated in FIG. 1.

In addition, the first and second shaft setting parts 120 and 130 are formed so that their upper portions may be opened in such a way that the first and second elastic member parts 150 and 160 and the plurality of disk parts 170 are assembled and then are easily fixedly set on the shaft part 140, as illustrated in FIG. 2.

In particular, the first and second shaft setting parts 120 and 130 may be disposed in the center of one side of the case part 110 so that the car shock absorber 100 may absorb shock easily when a car collides with the car shock absorber 100.

One side of the shaft part 140 is set on and fixed to the first shaft setting part 120, and the other side of the shaft part 140 is set on and fixed to the second shaft setting part 130.

Also, the first elastic member part 150 is disposed on the side of the shaft part 140 with which the car collides, and the second elastic member part 160 is disposed on an opposite side with which the car does not collide, so that the plurality of disk parts 170 are configured between the first and second elastic member parts 150 and 160.

Meanwhile, the shaft part 140 may not be fixedly set on the first and second shaft setting parts 120 and 130 but may be fixed into the case part 110 by forced coupling.

The first elastic member part 150 is inserted into the shaft part 140 and is configured at the first shaft setting part 120.

In this way, the first elastic member part 150 disposed on the first shaft setting part 120 is instantaneously compressed as the plurality of disk parts 170 make a forward movement, as indicated by an arrow B, when the car collides with the car shock absorber 100, as indicated by an arrow A illustrated in FIG. 1.

Subsequently, the second elastic member part 160 is compressed by an elastic and repellent force of the first elastic member part 150 that returns to its original state and a force transferred to the plurality of disk parts 170 using the first elastic member part 150.

Thus, when the car collides with the car shock absorber 100, the first and second elastic member parts 150 and 160 are repeatedly compressed and tensioned. This compression and tension are applied to move the plurality of disk parts 170 right and left.

The above-described first and second elastic member parts 150 and 160 may be formed of any material having elasticity, but they may be springs, representatively.

The plurality of disk parts 170 are inserted into the shaft part 140 and are configured between the first elastic member part 150 and the second elastic member part 160.

In this way, as the plurality of disk parts 170 disposed between the first and second elastic member parts 150 and 160 make a forward movement, as indicated by an arrow B, when the car collides with the car shock absorber 100, as indicated by an arrow A illustrated in FIG. 1, the first elastic member part 150 is compressed, and the second elastic member part 160 is tensioned. Subsequently, as the plurality of disk parts 170 proceed toward the second shaft setting part 130 due to restoration characteristics of the first elastic member part 150, the first elastic member part 150 is tensioned, and the second elastic member part 160 is compressed.

In this way, as the first and second elastic member parts 150 and 160 are repeatedly compressed and tensioned, the plurality of disk parts 170 are spaced apart from each other in a left/right direction and collide with each other so that the car shock absorber 100 may absorb shock.

Meanwhile, the plurality of disk parts 170 are separated from each other so as to proceed a pendulum motion according to collision energy transferred to the disk parts 170, because weights of cars that collide with the car shock absorber 100 are different from each other.

That is, when the colliding car has a small weight, collision energy is transferred to only a part of the entire disk parts 170, and when the colliding car has a large weight, collision energy is transferred to many parts of the entire disk parts 170. Thus, the disk parts 170 are configured to make a pendulum motion regardless of the weight of the colliding car.

Furthermore, at least one third elastic member part 180 may be disposed between the plurality of disk parts 170.

Figure 3:
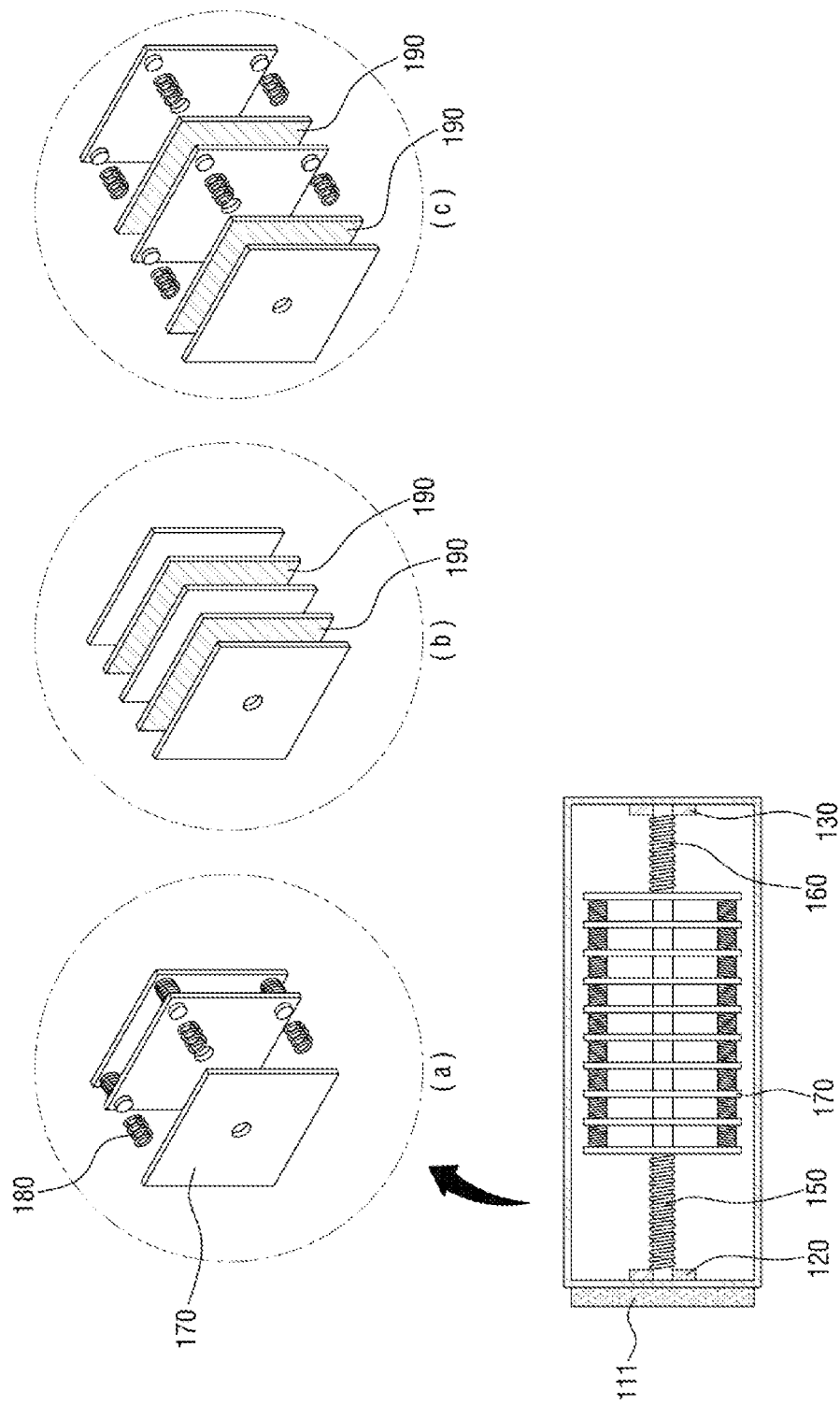
FIG. 3 is a view of a plurality of disk parts according to an embodiment of the present invention.

For example, as at least one third elastic member part 180 is disposed at edges of the disk parts 170 each having a rectangular shape, in the most ideal way, as illustrated in (a) of FIG. 3, shock alleviation and absorption of the car may be more easily performed due to an elastic effect that occurs during collision between the disk parts 170.

In this case, at least one third elastic member part 180 may be formed of any material having elasticity, but it may be springs, representatively.

Meanwhile, when at least one third elastic member part 180 is further disposed, the disk parts 170 absorb collision energy generated when the car collides with the car shock absorber 100 so that the disk parts 170 may proceed a pendulum motion without any limitation in the speed of the colliding car.

Also, the plurality of disk parts 170 may further include a shock absorbing member 190 that prevents brokenness of the disk parts 170 due to collision between the disk parts 170 in the most ideal way, as illustrated in (b) of FIG. 3.

In this case, the shock absorbing member 190 may be formed of rubber or fiber and a synthetic resin including cotton wool, nonwoven fabric or Styrofoam. In addition, the shock absorbing member 190 may also be implemented with other materials that absorb shock.

Furthermore, the plurality of disk parts 170 may include both the third elastic member part 180 and the shock absorbing member 180, as illustrated in (c) of FIG. 3.

For example, as the plurality of disk parts 170 includes the third elastic member part 180, the car shock absorber 100 may easily alleviate and absorb shock of the car. However, since brokenness of the disk parts 170 due to the shock of the car cannot be prevented, the plurality of disk parts 170 may further include the shock absorbing member 190 in a state in which the third elastic member part 180 is disposed in the plurality of disk parts 170.

Since the above-described car shock absorber 100 is configured to have a larger weight than the weight of the car, when the car collides with the car shock absorber 100, the colliding car just makes a fine movement, i.e., a forward movement of about 20 cm to about 30 cm, and all of energy caused by collision between the car shock absorber 100 and the car is absorbed.

That is, the car shock absorber 100 repeatedly performs the following operation, i.e., when the car collides with the car shock absorber 100, the plurality of disk parts 170 make a forward movement toward the colliding car so that the first elastic member part 150 is compressed and the second elastic member part 160 is tensioned, and subsequently, as the plurality of disk parts 170 proceed toward an opposite side of the colliding car due to an elastic and repellent force of the first elastic member part 150, the first elastic member part 150 is tensioned, and the second elastic member part 160 is compressed.

As a result, when the car collides with the car shock absorber 100, the first and second elastic member parts 150 and 160 and the plurality of disk parts 170 make a pendulum motion so that the colliding car stops when colliding and the car shock absorber 100 absorbs shock due to the pendulum motion.

Figure 4:
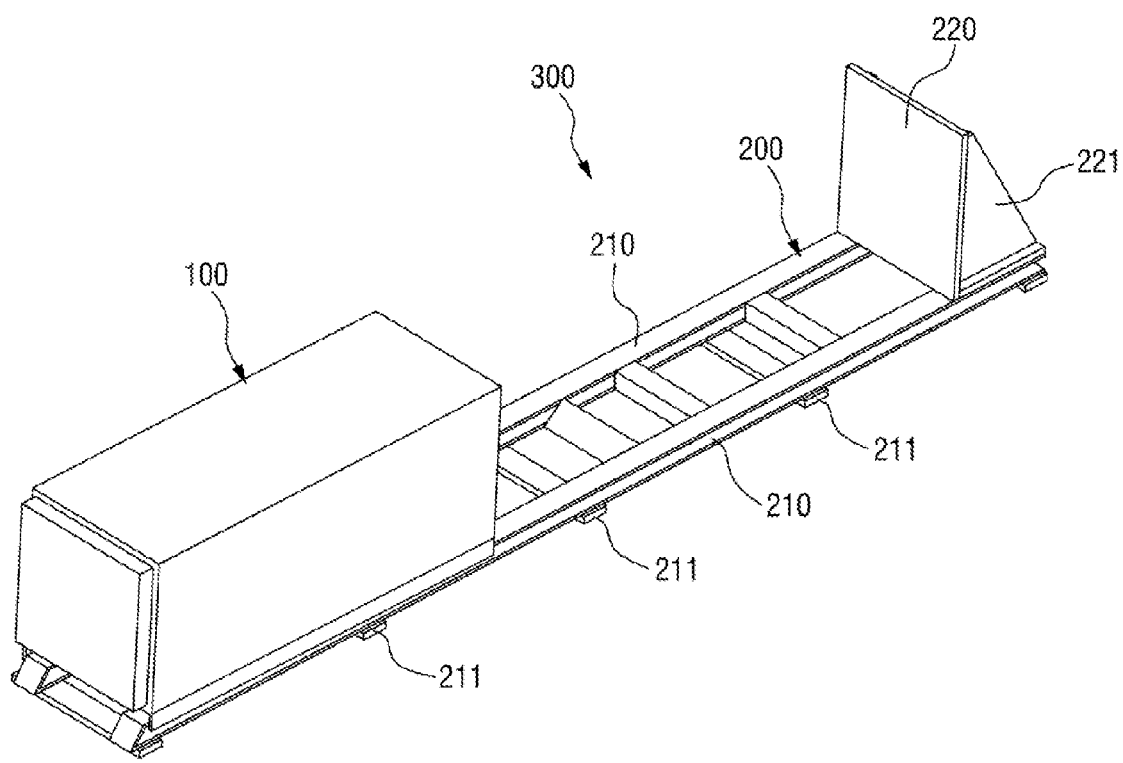
FIG. 4 is a view showing a configuration of a car shock absorbing device according to an embodiment of the present invention.

FIG. 4 is a view showing a configuration of a car shock absorbing device according to an embodiment of the present invention. Referring to FIG. 4, a car shock absorbing device 300 includes a car shock absorber 100 and a car shock guide 200.

The car shock absorber 100 may absorb shock when the car collides with the car shock absorber 100 as the car shock absorber 100 proceeds a pendulum motion when the car collides with the car shock absorber 100, as described above in detail with reference to FIGS. 1 through 3. However, due to path separation of the car shock absorber 100 during car collision, another accident may occur. Thus, the car shock absorbing device 300 may further include the car shock guide 200.

The car shock guide 200 includes a rail part 210 and a fixture part 220.

In more detail, the car shock absorber 100 is moved on the rail part 210.

That is, the rail part 210 is designed to be fixed to the ground to be spaced apart from a fixing plate 211 along a lengthwise direction of the fixing plate 211, as illustrated in FIG. 4.

Figure 5:
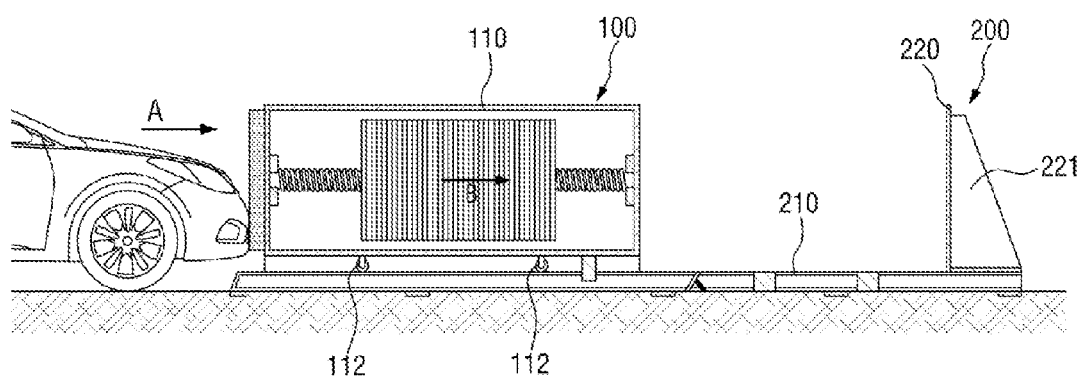
FIG. 5 is a view showing a case where a car collides with the car shock absorbing device illustrated in FIG. 4.

Thus, as the rail part 210 is configured so that, when the car collides with the car shock absorber 100 in a direction indicated by an arrow A, as illustrated in FIG. 5, the car shock absorber 100 may be conveyed along a railroad in a direction indicated by an arrow B, the car shock absorber 100 alleviates shock due to operations of the first and second shaft setting parts 120 and 130, the shaft part 140, the first and second elastic member parts 150 and 160, and the plurality of disk parts 170 that are elements of the car shock absorber 100 when the car collides with the car shock absorber 100, and the car shock absorber 100 is pushed in a shock direction, i.e., in the direction indicated by the arrow B.

Meanwhile, when castors 112 are disposed at a lower portion of the case part 110 of the car shock absorber 100, the rail part 210 may further include separation prevention steel 230 for preventing the castors 112 from being separated from the case part 110.

Figure 6:
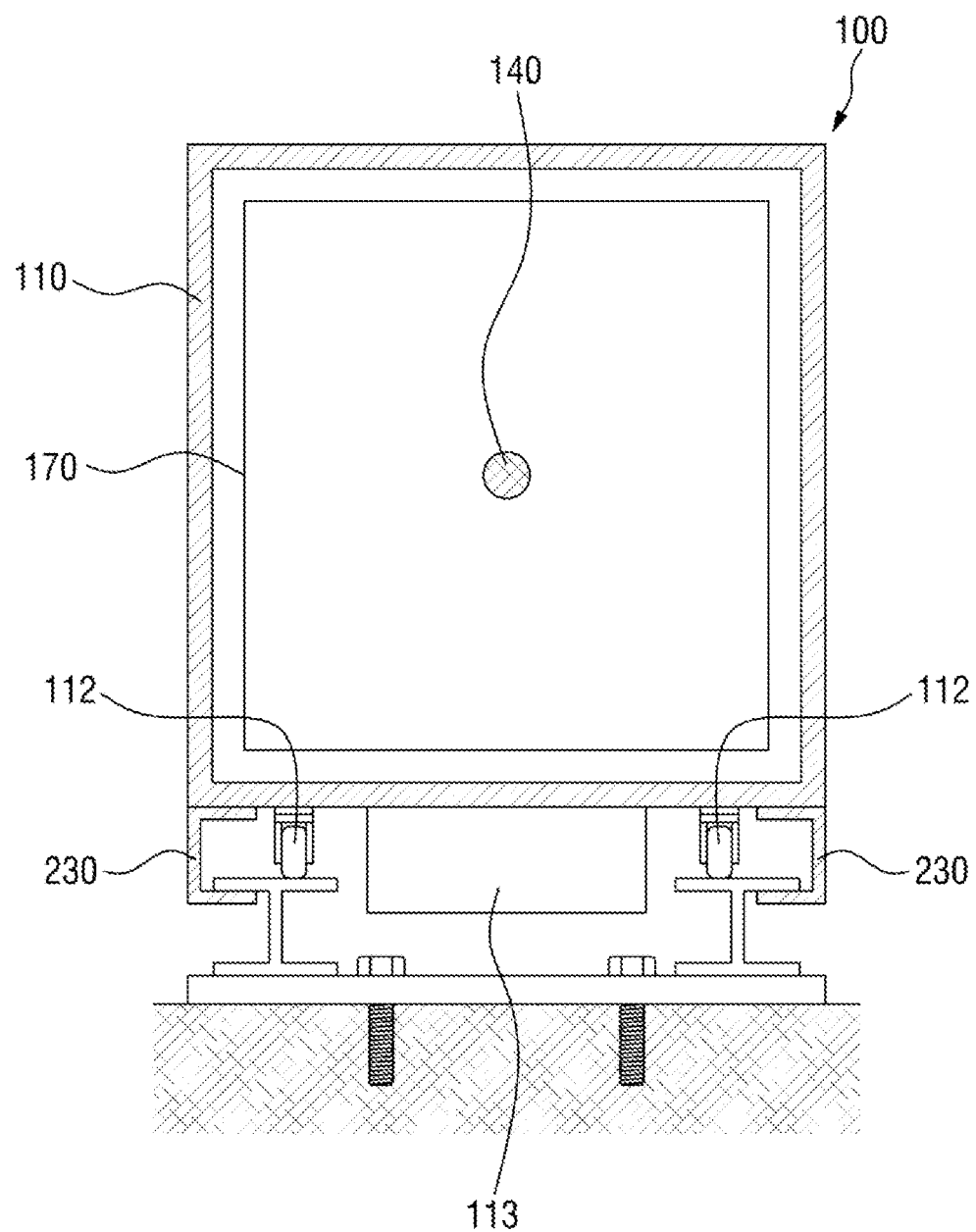
FIG. 6 is a cross-sectional view of a configuration of separation prevention steel according to an embodiment of the present invention.

That is, as illustrated in FIG. 6, the castors 112 disposed at the lower portion of the case part 110 of the car shock absorber 100 move along a rail. If the car collides with the car shock absorber 100, a considerably large shock force is generated when the car collides with the car shock absorber 100. Thus, when the castors 112 are separated from the case part 110, there is no shock absorption effect, and separation of the car shock absorber 100 causes an accident in another driving car. Thus, the rail part 210 further includes the separation prevention steel 230 for preventing separation of the castors 112.

In particular, when the rail part 210 further includes a projection plate 113 disposed at the lower portion of the case part 110 of the car shock absorber 100, the rail part 210 may further include a stopping part 240 including a stopping piece 241 on which the projection plate 113 is hung, and a fourth elastic member part 242 that is connected to the stopping piece 241 and provides elasticity.

Figure 7:
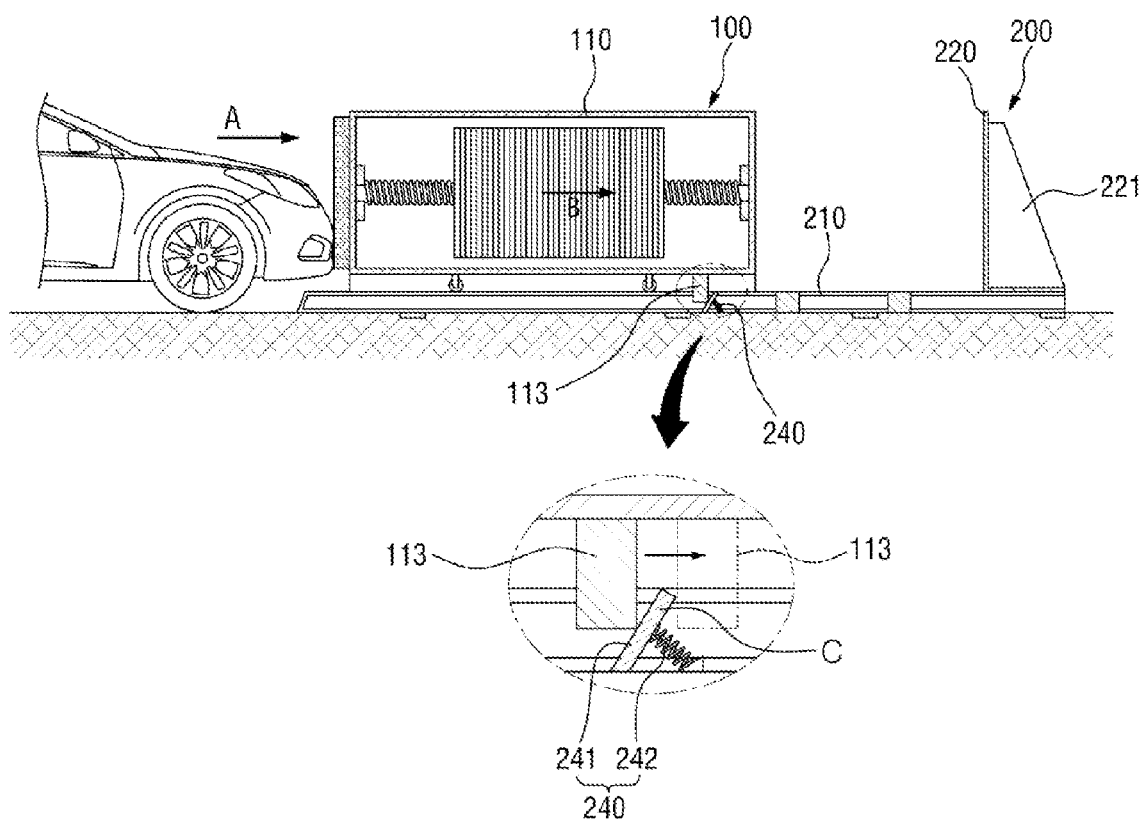
FIG. 7 is a cross-sectional view of a configuration of a stopping part according to an embodiment of the present invention.

For example, the projection plate 113 disposed at the lower portion of the case part 110 of the car shock absorber 100 prevents the car from colliding again with the car shock absorber 100 as a stopping phenomenon occurs, as indicated by portion C of FIG. 7, when the stopping part 240 is disposed at an arbitrary point of the rail part 210, as illustrated in FIG. 7, if the car collides with the car shock absorber 100 in the direction indicated by the arrow A and the car shock absorber 100 proceeds in the direction indicated by the arrow B, the projection plate 113 passes through the stopping piece 241 by overcoming an elastic and support force of the stopping piece 241 and collides with the fixture part 220 and then, the car shock absorber 100 proceeds toward the car due to reaction.

That is, in a state in which the projection plate 113 configured at the case part 110 of the car shock absorber 100 due to the fourth elastic member part 242 that elastically supports the stopping piece 241 passes the stopping piece 241 and then is conveyed, the car shock absorber 100 is continuously moved, and after the car collides with the fixture part 220, even when the car shock absorber 100 returns to the car due to a repulsive force due to collision, the stopping piece 241 has a gradient and thus, the stopping part 240 may completely prevent the stopping piece 241 from being hung on the projection plate 113, as indicated by portion C of FIG. 7, and a front end of the car shock absorber 100 from colliding with the car.

Also, the car shock absorber 100 is again disposed at a front part of the rail, i.e., at a portion where the car collides with the car shock absorber 100, and is reused without reinstallation after primary car collision so that secondary car collision may be immediately prevented.

Furthermore, the rail part 210 may further include a plurality of broken parts 250 that are disposed between the stopping part 240 and the fixture part 220 and offset shock of the car shock absorber 100 when the car collides with the car shock absorber 100.

Figure 8:
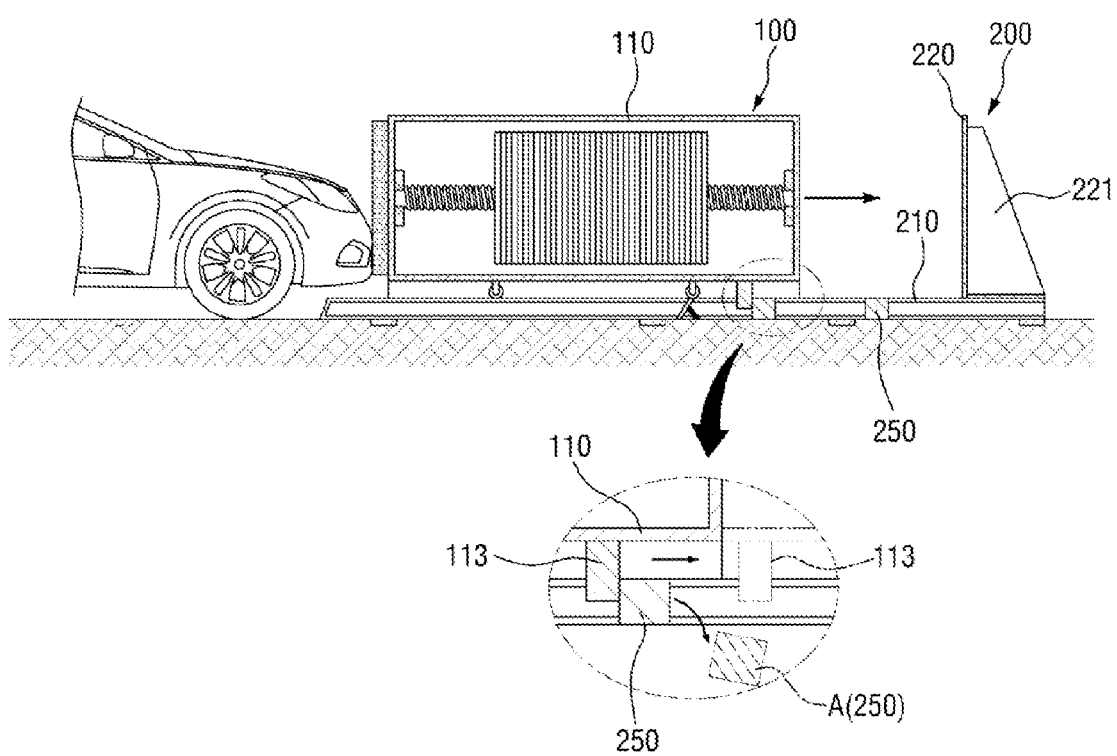
FIG. 8 is a cross-sectional view of a configuration of broken parts according to an embodiment of the present invention.

For example, the plurality of broken parts 250 are broken, as indicated by portion A (250) illustrated in FIG. 8, because the car shock absorber 100 proceeds along the rail 210 due to car collision and passes through the stopping part 240, the car collides with the projection plate 113 disposed at the case part 110 of the car shock absorber 100.

As a result, the plurality of broken parts 250 absorb shock and simultaneously remarkably reduce the speed of the car, and in particular, may reduce in lowering of the speed of a large car having a large weight that may occur when the large car collides with the car shock absorber 100.

The fixture part 220 is configured to be supported on a support bracket 221 disposed on an opposite side at which the car shock absorber 100 is disposed.

In addition, the fixture part 220 collides with the car shock absorber 100 that is moved along the rail part 210 due to car collision and offsets shock of the car shock absorber 100 during car collision.

As a result, according to the present invention, during car collision, primary shock is absorbed on the elastic pad 111, and the car shock absorber 100 absorbs secondary shock due to operations of the first and second elastic member parts 150 and 160 and the plurality of disk parts 170, and third shock is absorbed by the broken parts 250 absorb third shock, and fourth shock is absorbed by the fixture part 220.

Also, according to the present invention, the movement speed of the car shock absorber 100 may be remarkably reduced during a shock absorption operation. The car shock absorber 100 that alleviates shock of the car, is disposed adjacent to the fixture part 240 and then absorbs shock due to an internal configuration of the car shock absorber 100 due to reaction. Even though, after the car shock absorber 100 collides with the fixture part 220, a restoration force to an opposite direction to the proceeding direction of the car shock absorber 100, i.e., a direction in which the car is placed, is applied to the car shock absorber 100, a considerable part of the restoration force is offset, and the restoration force is strong. Thus, even though the car shock absorber 100 is placed again toward the car, the car shock absorber 100 stops due to the stopping part 240. Thus, a secondary collision phenomenon between the car shock absorber 100 and the car does not occur.

As described above, since a lower surface of the protruding car collides with the above-described car shock absorber 100, even though the entire size of the car shock absorber 100 is configured to be not smaller than that of the car even though the car shock absorber 100 has a larger weight than that of the car, the car shock absorber 100 absorbs shock through the pendulum motion, and even though the length of the rail part 210 is not very large due to the stopping part 240, the car shock absorber 100 prevents secondary collision with the colliding car.

For example, when the car shock absorber 100 has the height of 70 to 90 cm, the width of 40 to 60 cm and a larger weight than that of the car, the car shock absorber 100 may make the pendulum motion, and the length of the rail part 240 may be about at least 4 m.

As described above, in a car shock absorber and a car shock absorbing device using the same according to the one or more of embodiments of the present invention, damage of a car and casualties that may occur when the car collides with the car shock absorber and the car shock absorbing device, can be prevented, and even when the car collides with the car shock absorber and the car shock absorbing device, driving of another car is not disturbed so that the occurrence of an accident can be prevented. A car shock absorbing device according to the related art has to be reinstalled when colliding with the car once; however, the car shock absorbing device according to the present invention can be repeatedly reused without reinstallation even after colliding with the car.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A car shock absorber comprising:
   a case part having an elastic pad disposed at a side with which a car collides;
   a first shaft setting part configured in the case part and fixedly coupled to the side with which the car collides;
   a second shaft setting part fixed in the case part, disposed to face the first shaft setting part and fixedly coupled to the case part;
   a shaft part having one side set on and fixed to the first shaft setting part and the other side set on and fixed to the second shaft setting part;
   a first elastic member part inserted into the shaft part and configured at the first shaft setting part;
   a second elastic member part inserted into the shaft part and configured at the second shaft setting part;
   a plurality of disk parts inserted into the shaft part and configured between the first elastic member part and the second elastic member part; and
   a car shock guide comprising a rail part on which the car shock absorber is moved, and a fixture part configured at an opposite side at which the car shock absorber is disposed, to be supported by a support bracket,
   wherein, when a projection plate is further disposed at the lower portion of the case part of the car shock absorber, the rail part further comprises a stopping part comprising a stopping piece on which the projection plate is hung, and a fourth elastic member part that is connected to the stopping piece and provides elasticity.

2. The car shock absorber of claim 1, wherein the plurality of disk parts comprise at least one third elastic member part disposed between the disk parts.

3. The car shock absorber of claim 1, wherein the plurality of disk parts comprise at least one shock absorbing member formed of rubber or fiber disposed between the disk parts.

4. A car shock absorbing device comprising:
   a car shock absorber comprising a case part having an elastic pad disposed at a side with which a car collides, a first shaft setting part configured in the case part and fixedly coupled to the side with which the car collides, a second shaft setting part fixed in the case part, disposed to face the first shaft setting part and fixedly coupled to the case part, a shaft part having one side set on and fixed to the first shaft setting part and the other side set on and fixed to the second shaft setting part, a first elastic member part inserted into the shaft part and configured at the first shaft setting part, a second elastic member part inserted into the shaft part and configured at the second shaft setting part, and a plurality of disk parts inserted into the shaft part and configured between the first elastic member part and the second elastic member part; and a car shock guide comprising a rail part on which the car shock absorber is moved, and a fixture part configured at an opposite side at which the car shock absorber is disposed, to be supported by a support bracket,
   wherein, when a projection plate is further disposed at the lower portion of the case part of the car shock absorber, the rail part further comprises a stopping part comprising a stopping piece on which the projection plate is hung, and a fourth elastic member part that is connected to the stopping piece and provides elasticity.

5. The car shock absorbing device of claim 4, wherein the plurality of disk parts comprise at least one third elastic member part disposed between the disk parts.

6. The car shock absorbing device of claim 4, wherein the plurality of disk parts comprise at least one shock absorbing member formed of rubber or fiber disposed between the disk parts.

7. The car shock absorbing device of claim 4, wherein, when castors are further disposed at a lower portion of the case part of the car shock absorber, the rail part further comprises separation prevention steel for preventing castors from being separated from the case part.

8. The car shock absorbing device of claim 4, wherein the rail part further comprises a plurality of broken parts that are disposed between the stopping part and the fixture part and offset shock of the car shock absorber when the car collides with the car shock absorber.

9. The car shock absorbing device of claim 5, wherein the plurality of disk parts comprise at least one shock absorbing member formed of rubber or fiber disposed between the disk parts.

\* \* \* \* \*